United States Patent [19]

Yabe

[11] Patent Number: 4,827,149

[45] Date of Patent: May 2, 1989

[54] OPERATION HALTING CIRCUIT

[75] Inventor: Yasuji Yabe, Tenri, Japan

[73] Assignee: Sharp Kabushiki Kaisha, Osaka, Japan

[21] Appl. No.: 106,354

[22] Filed: Oct. 9, 1987

[30] Foreign Application Priority Data

Oct. 9, 1986 [JP] Japan ................... 61-240824

[51] Int. Cl.⁴ .......................... H02J 7/00; H02H 3/24
[52] U.S. Cl. ...................... 307/64; 307/141; 307/116; 361/88; 361/92; 365/229; 365/228
[58] Field of Search .............. 307/116, 64, 35, 38, 307/66, 592, 597, 296 R, 598, 362, 208, 238, 234; 361/90, 91, 92, 93, 196, 187, 107, 110, 85–89, 96, 78, 79, 72; 365/226, 227, 228, 229

[56] References Cited

U.S. PATENT DOCUMENTS

| | | | |
|---|---|---|---|
| 3,642,479 | 2/1987 | Lombardi et al. | 361/89 X |
| 4,047,233 | 9/1977 | Yorks et al. | 361/88 |
| 4,245,150 | 1/1981 | Driscoll et al. | 361/92 X |
| 4,288,831 | 9/1981 | Dolikian | 361/92 |
| 4,301,540 | 11/1981 | Sato et al. | 361/92 X |
| 4,432,030 | 2/1984 | Briccetti | 361/92 |
| 4,439,805 | 3/1984 | Tarleton | 361/92 |
| 4,520,418 | 5/1985 | Susi | 361/92 |
| 4,530,027 | 7/1985 | Berger | 361/89 X |
| 4,591,914 | 5/1986 | Hakamada et al. | 307/64 X |
| 4,599,672 | 7/1986 | Planar et al. | 361/91 X |
| 4,600,962 | 7/1986 | Bliehall | 361/92 X |
| 4,611,126 | 9/1986 | Miller | 361/89 X |
| 4,611,295 | 9/1986 | Fowler | 361/78 X |
| 4,642,479 | 2/1987 | Lombardi et al. | 361/89 |
| 4,685,023 | 8/1987 | Heaston | 361/88 |

*Primary Examiner*—William M. Shoop, Jr.
*Assistant Examiner*—Paul Ip
*Attorney, Agent, or Firm*—Birch, Stewart, Kolasch & Birch

[57] ABSTRACT

An operation halting circuit comprises a circuit for controlling a system which executes a specified operation and a circuit for shutting off every input to the control circuit so as to prevent the supply voltage from being applied to the control circuit when the supply voltage drops below a specified threshold value.

6 Claims, 4 Drawing Sheets

OPERATION HALTING CIRCUIT

BACKGROUND OF THE INVENTION

The present invention relates to an operation halting circuit which stops the operation of a control means in a system when the supply voltage drops.

Conventionally, a system containing a microprocessor and peripheral circuits, such as memories, connected to the microprocessor is designed to be reset asynchronously with the operation of the system itself either manually by an operator or automatically by a control circuit when the supply voltage to the microprocessor and the peripheral circuits drops below a specified value. However, by utilizing the conventional system a problem exists wherein the programs and data retained in the memories, connected to the control circuit of the system, are destroyed.

SUMMARY OF THE INVENTION

The object of the present invention is to solve the above problem by providing an operation halting circuit capable of disabling the control means of a system from carrying out any control operations, such as resetting, operation start, etc., when the supply voltage drops below a specified threshold value.

The present invention comprises means for controlling a system that carries out a particular operation and means for shutting off every signal input from said control means to prevent the supply voltage from being applied to the control means when the supply voltage drops below a specified threshold value.

According to the present invention, when the supply voltage is lower than the specified threshold value, all inputs are shut off from the control means so that the supply voltage will not be applied to the control means. Therefore, instructions, such as reset instruction, operation start instruction, etc., are no longer inputted to the control means. As a result, the control means stops operation, and thus is prevented from erroneous operation. Moreover, the programs and data stored in the memories connected to the control means are protected against destruction.

BRIEF DESCRIPTION OF THE DRAWINGS

The present invention will become more fully understood from the detailed description given below and the accompanying drawings which are given by way of illustration only, and thus are not limitative of the present invention and wherein.

DESCRIPTION OF THE PREFERRED EMBODIMENT

Figure 1:
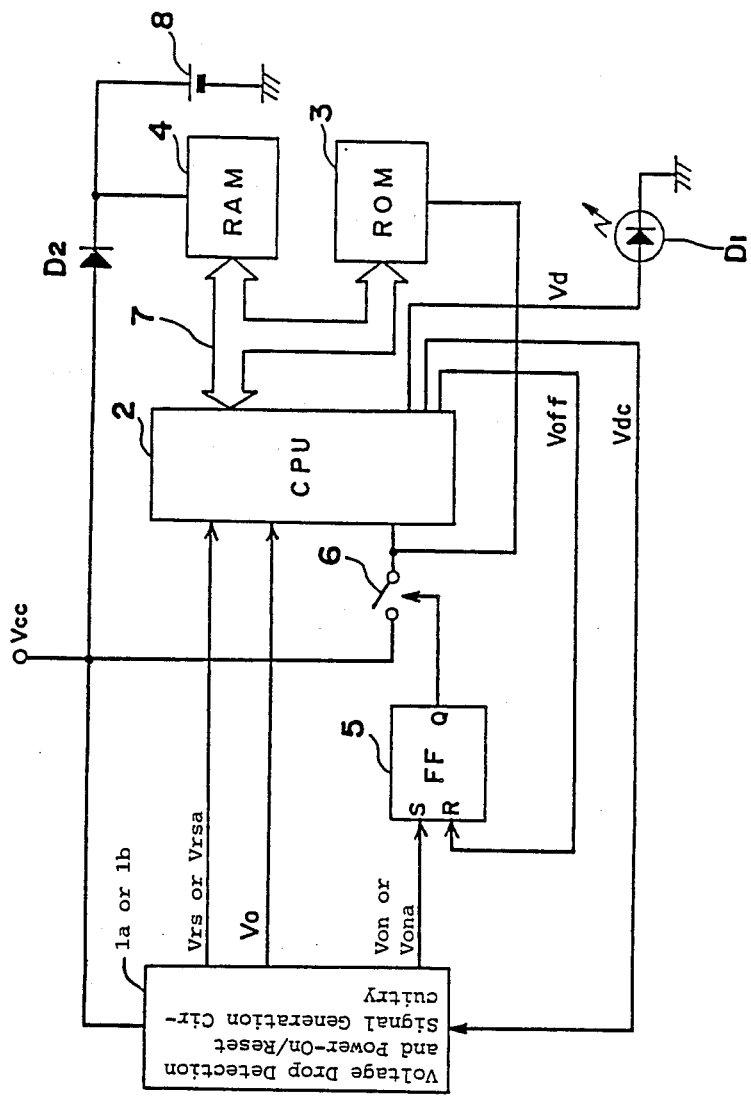
FIG. 1 is a block diagram of an embodiment of the operation halting and resuming circuit provided for supply voltage drop of the present invention.

FIG. 1 is a block diagram of an embodiment of the operation halting and resuming circuit provided for supply voltage drop of the present invention. In this circuit, a central processing unit (hereinafter abbreviated as CPU) 2 controls a system (not shown) according to programs and data stored in a read only memory (hereinafter abbreviated as ROM) 3 and in a random access memory (hereinafter abbreviated as RAM) 4. The circuit of the present invention is characterized in that when the supply voltage to the controlled system drops, the circuit transfers the data in program counters and other data from the CPU 2 to the RAM 4 before setting the CPU 2 in the standby state causing every control operation to stop.

Referring to FIG. 1, 1a or 1b is a voltage drop detection and power-on/reset signal generation circuitry. When the voltage of a DC power supply, Vcc, being applied to the circuitry 1a or 1b drops below a specified threshold value, the level of a signal Vo output to the CPU 2 is changed from H to L. The circuitry 1a or 1b is constructed as shown in FIGS. 2 and 3.

Figure 2:
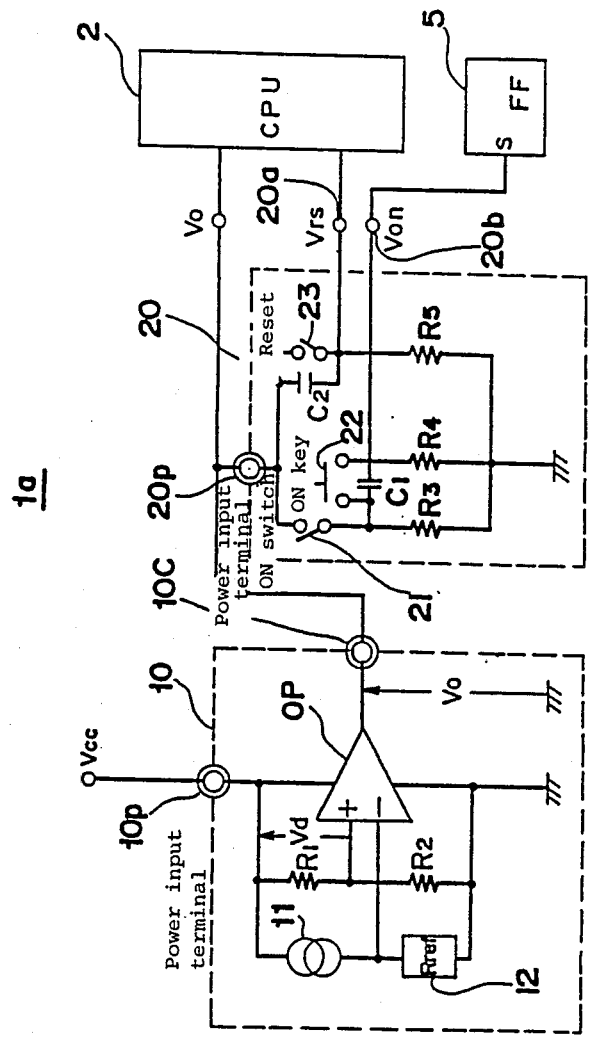
FIG. 2 is a circuit diagram of a first embodiment of the voltage drop detection and power-on/reset signal generation circuitry of FIG. 1.

FIG. 2 is a circuit diagram of the first embodiment of the voltage drop detection and power-on/reset signal generation circuitry 1a of FIG. 1. A voltage drop detection integrated circuit 10 has a power input terminal 10p connected to the DC power supply, Vcc, and a signal output terminal 10c connected to a power input terminal 20p of a power-on/reset signal generation circuit 20. A signal outputted from the signal output terminal 10c is sent as a voltage drop signal Vo to the CPU 2. The power-on/reset signal generation circuit 20 has a reset signal output terminal 20a connected to the CPU 2 and an ON signal output terminal 20b connected to the set signal input terminal of a set/reset flip flop (hereinafter referred to as RS flip flop) 5.

Using the voltage drop detection and power-on/reset signal generation circuitry 1a as shown in FIG. 2, when the voltage of the DC power supply, Vcc, being applied to the power input terminal 10p is not lower than a specified threshold value, a H level signal of a specified positive voltage is outputted from the signal output terminal 10c to the power-on/reset signal generation circuit 20 and to the CPU 2. When the voltage of the dc power supply, Vcc, being applied to the power input terminal 10p is lower than the specified threshold value, a, L level signal of earth potential is output from the signal output terminal 10c to the power-on/reset signal generation circuit 20 and to the CPU 2. During this state, if an ON switch 21, an ON key 22 or a RESET switch 23 of the power-on/reset signal generation circuit 20 is set ON, a pulse of positive voltage is not received from the signal output terminals 20a and 20b. Consequently, the CPU 20 is set in the standby state causing the CPU 2 not to operate.

Figure 3:
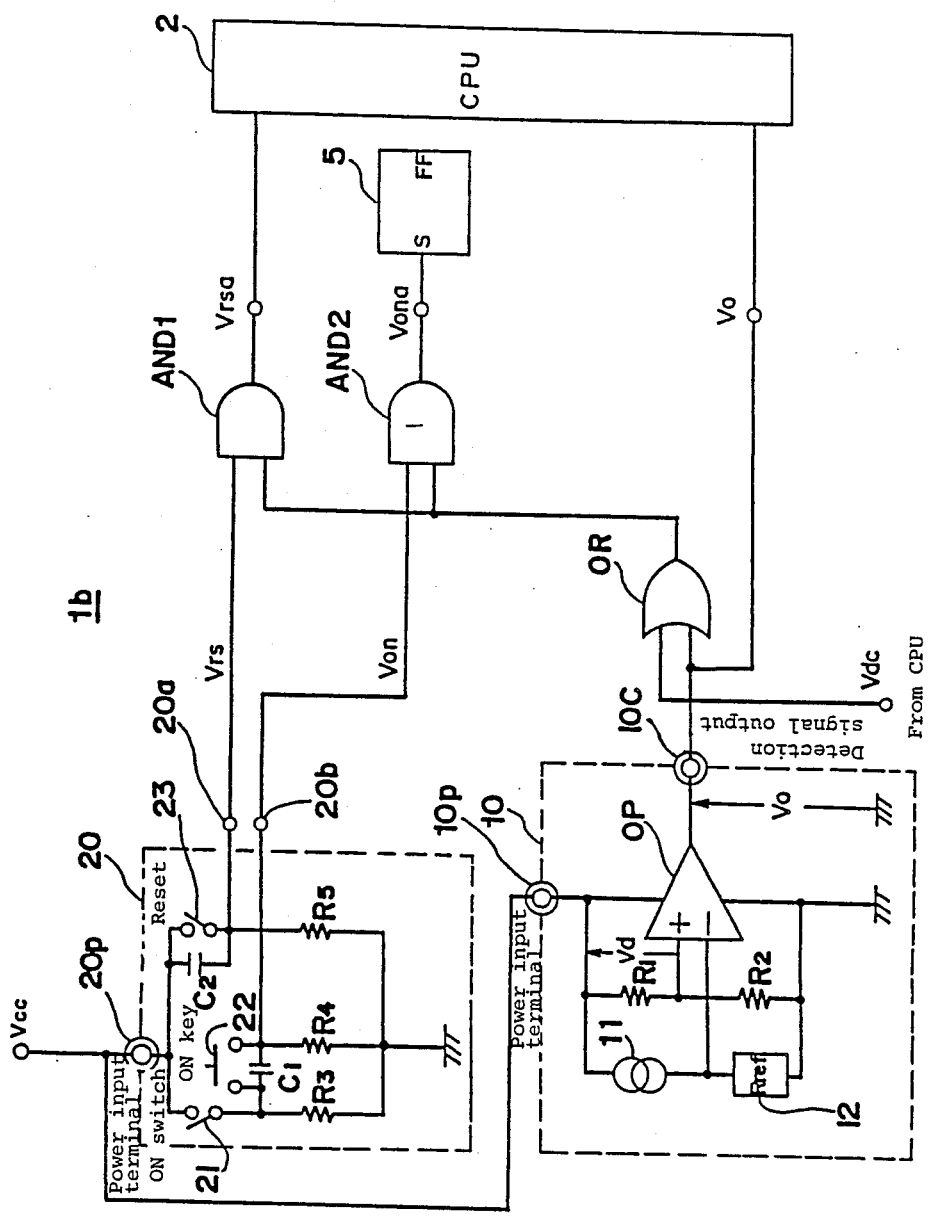
FIG. 3 is a circuit diagram of a second embodiment of the voltage drop detection and power-on/reset signal generation circuitry of FIG. 1.

FIG. 3 is a circuit diagram of a second embodiment of the voltage drop detection and power-on/reset signal generation circuitry 1b of FIG. 1. In this embodiment, a DC power supply, Vcc, is connected to both the power input terminal 10p of a voltage drop detection integrated circuit 10 and the power input terminal 20p of a power-on/reset signal generation circuit 20. The output terminal 10c of the voltage drop detection integrated circuit 10 is connected to the first input terminal of an OR-gate OR. A signal outputted from the output terminal 10c is sent as a voltage drop detection signal Vo to a CPU 2. Power-on signal Vdc output from the CPU 2 is sent to the second input terminal of the OR-gate OR. The power-on signal Vdc is at a H level when the supply voltage is applied to the CPU 2 and at a L level when the supply voltage is not applied to the CPU 2. The output terminal of the OR-gate OR is connected to the first input terminals of AND-gates AND 1 and AND 2. The reset signal output terminal 20a and the ON signal output terminal 20b of the power-on/reset signal generation circuit 20 are connected to the second input terminals of the AND-gates AND 1 and AND 2, respectively. When the supply voltage is applied, a signal from the output terminal of the AND-gate AND 1 is sent as a reset signal Vrsa to the CPU 2 and a signal from the output terminal of the AND-gate AND 2 is sent as an ON-signal Vona to the set signal input terminal of a RS flip flop 5.

Using the voltage drop detection and power-on/reset signal generation circuitry 1b of FIG. 3, when a dc voltage that is not lower than a specified value is applied to the power input terminal 10p of the voltage drop detection integrated circuit 10 or when the specified supply voltage is applied to the CPU 2 (namely when the signal Vdc is at H level), reset signal Vrs outputted from the power-on/reset signal generation circuit 20 is sent as Vrsa to the CPU 2 and, ON signal Von from the power-on/reset signal generation circuit 20 is outputted as Vona to the RS flip flop 5.

Now, the construction of the operation halting and resuming circuit of the present invention will be described with reference to FIG. 1. The DC power supply, Vcc, comprises a battery that is connected to the power input terminals of the CPU 2 and the ROM 3 via a switch 6. Switch 6 which is controlled by signals output from the Q outputted terminal of the RS flip flop 5. The DC power supply, Vcc, is also connected to the anode of a diode $D_2$ whose cathode is connected to the power input terminal of the RAM 4 and to the positive electrode of a backup DC power supply 8. The negative electrode of the backup DC power supply 8 is connected to the ground. Therefore, the RAM 4 is always fed with a specified voltage through the diode $D_2$ from the DC power supply, Vcc. When the supply voltage of the DC power supply, Vcc, drops or when the power from the DC power supply, Vcc, is shut off, the specified voltage is applied to the RAM 4 from the backup DC power supply 8. The switch 6 is set ON when the Q output terminal of the RS flip flop 5 is at H level, and OFF when the Q output terminal is at L level.

The CPU 2 is connected, via a bus 7, to the controlled system, to the ROM 3 which stores system programs for controlling the operation halting and resuming circuit, and to the RAM 4 which retains the work area for executing the above system programs and which stores the data from the program counter of the CPU 2 and other data when the supply voltage drops. The CPU 2 operates according to a system program stored in the RAM 4. The CPU 2 checks the level of the input signal Vo at a specified interval, outputting a H level signal Vd to a light emitting diode $D_1$ to turn on the diode $D_1$, and outputting a H level off-signal Voff to the reset terminal of the RS flip flop 5 when the signal Vo is at a L level. The signal Vd and the off-signal Voff are at a L level when the signal Vo input to the CPU 2 is at a H level. When supply voltage being applied to the power input terminal of the CPU 2 is lower than the specified threshold value, the CPU 2 changes the level of the power-on signal Vdc from H to L. The RS flip flop 5 sets the Q output terminal at a H level when the H level signal is inputted to the set signal input terminal and at a L level when the H level signal is inputted to the reset signal input terminal.

Operation of the operation halting and resuming circuit utilizing the above mentioned construction will be described with reference to FIGS. 1, 4 and 5.

Assuming that the supply voltage of the DC power supply, Vcc, is not lower than the specified threshold value and that the power is supplied from the DC power supply, Vcc, to the voltage drop detection and power-on/reset signal generation circuitry 1a or 1b, the circuitry 1a or 1b outputs a H level signal Vo to the CPU 2 and sends a H level pulse to the set signal input terminal of the RS flip flop 5, when the supply voltage is applied from the DC power supply, Vcc,. Consequently, the Q output terminal of the RS flip flop 5 is set at a H level so that the switch 6 is closed, allowing power from the DC power supply, Vcc, to be supplied to the CPU 2 and to the ROM 3. Thus, the CPU 2 starts operating.

The CPU 2 is always executing a specified processing routine (hereinafter referred to as a normal processing routine) for controlling the system, according to the system programs stored in the ROM 3. During the execution of the normal processing routine, the CPU 2 executes the voltage drop detecting and processing routine shown in FIG. 4, repetitively, during a specified cycle of time.

Figures 4, 5:
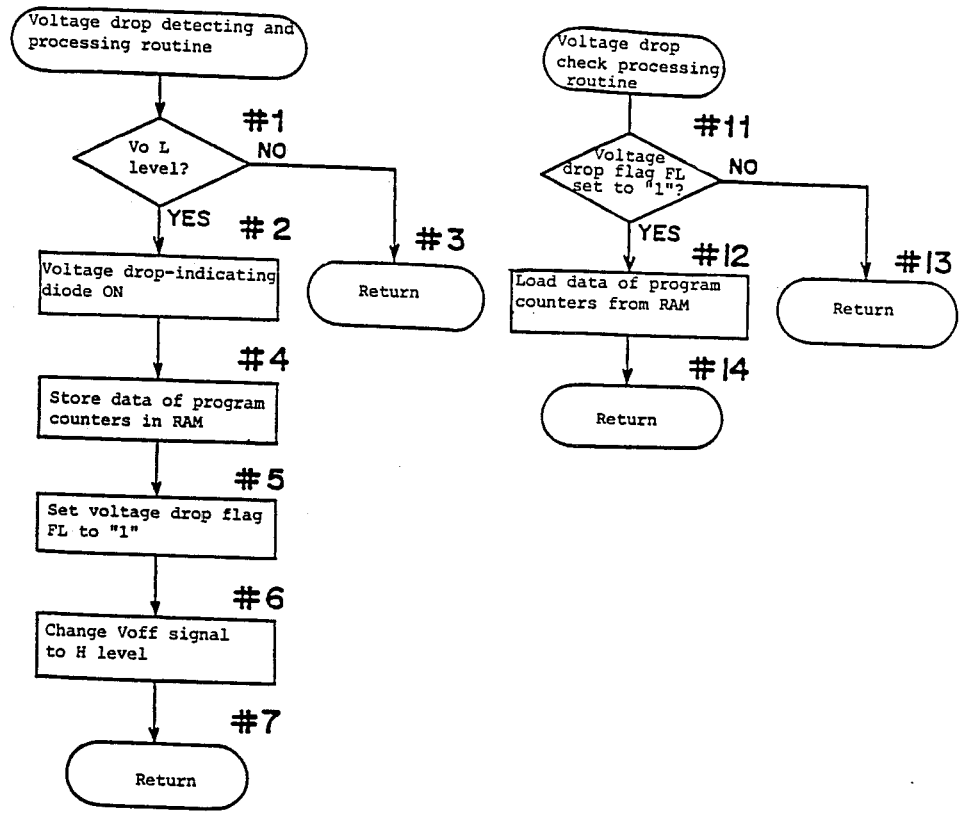
FIG. 4 is a flow chart of a voltage drop detecting and processing routine.
FIG. 5 is a flow chart of a voltage drop check processing routine.

Referring to the flow chart of FIG. 4 showing the processing routine, the CPU 2 judges if the signal Vo inputted to the CPU 2 is L level in the step 1. When the signal Vo is at L level, the program proceeds to the step 2, or otherwise the program proceeds to the step 3 and returns to the flow of the normal processing routine. In the step 2, the CPU 2 outputs a H level signal Vd to the light emitting diode $D_1$ to turn on the diode $D_1$ for indicating a voltage drop. In the step 4 the CPU 2 transfers the data stored in the program counter, etc. of the CPU 2, through the bus 7, to the RAM 4 and stores them in the RAM 4. After setting the voltage drop flag FL in the RAM 4 at "1" in the step 5, the CPU 2 changes the level of the signal Voff outputted to the reset signal input terminal of the RS flip flop 5 to a H level in the step 6 and returns to the normal processing routine. As the H level signal Voff is input to the reset signal inputted terminal of the RS flip flop 5, the Q output terminal of the RS flip flop 5 is set at a L level, opening the switch 6 so that power from the DC power supply, Vcc, is shut off from the CPU 2 and the ROM 3. When the supply voltage of the DC power supply, Vcc recovers and exceeds the specified threshold value, as in when the battery of the DC power supply Vcc is replaced, the voltage drop detection and power-on/reset signal generation circuitry 1a or 1b output a H level signal Vo to the CPU 2 and output an ON signal Von or Vona having a H level pulse to the set signal input terminal of the RS flip flop 5 to set the RS flip flop 5. As a result, the Q output terminal is set at a H level so that the switch 6 is closed, allowing the power of the voltage exceeding the specified threshold to be supplied from the DC power supply, Vcc, to the CPU 2 and to the ROM 3. Thus, the CPU 2 resumes the operation, executing its normal initialization processing routine. The CPU 2 executes the voltage drop check processing routine shown in FIG. 5 at least prior to the system program.

Referring to the flow chart of FIG. 5, the CPU 2 judges if the voltage drop flag FL in the RAM 4 is set to "1" in the step 11. When the flag FL is set to "1", the program proceeds to the step 12, or otherwise the program proceeds to the step 13 and returns to the normal initialization processing routine. In the step 12, after transferring data of the program counter and other data saved in the RAM 4 to each counter in the CPU 2 and loading them into the CPU 2, the program proceeds to the step 14 and returns to the initialization processing routine. After completion of the initialization processing routine, the CPU 2 executes a specified program starting from the program count loaded during CPU 2 in the step 12. As mentioned above, when the voltage of the DC power supply Vcc drops below the specified threshold value, the voltage drop detection and power-on/reset signal generation circuitry 1a or 1b output a L level signal Vo. In response to this L level signal, the CPU 2 actuates the voltage drop-indicating light-emitting diode $D_l$ to light as well as outputting a H level signal Voff to the reset signal input terminal of the RS flip flop 5. Consequently, the Q output terminal of the RS flip flop 5 is set at L level, opening the switch 6, thus preventing power from being supplied from the DC power supply, Vcc, to the CPU 2 and the ROM 3. During this state, since the voltage drop detection and power-on/reset signal generation circuitry 1a or 1b cannot output the reset signal Vrs or Vrsa, the CPU 2 can not be reset. With no power supplied, the CPU 2 is in the standby state in which the CPU 2 cannot be operated. Therefore, no operation are executed by the CPU 2. Since the system programs have been saved in the ROM 3, as described above, and the data of the program counters and other data in the CPU 2 have been stored in the RAM 4 fed by power from the backup DC power supply 8, the system programs and data are not destroyed.

Two examples have been shown of the voltage drop detection and power-on/reset signal generation circuitry of the operation halting and resuming circuit of FIG. 1. The voltage drop detection and power-on/reset signal generation circuitry 1b of FIG. 3 can be advantageous over the circuitry 1a of FIG. 2. With the circuitry 1a of FIG. 2, if the CPU 2 runs away for some reason while a specified supply voltage is being applied, and if the supply voltage drops below the specified threshold value thereafter, the voltage drop detection integrated circuit 10 outputs a L level signal Vo so that it is not possible to reset the CPU 2. For a pocketable computer, the ON key 22 works as a program execution interrupting switch (or pause switch). Therefore, if the supply voltage drops below the specified threshold value while a program is running, the execution of the program cannot be halted by the ON key 22 because the ON key 22 does affect the functioning of the voltage drop detection and power-on/reset signal generation circuitry 1a of FIG. 2. In the circuitry 1b of FIG. 3, to eliminate this disadvantage, the DC power supply, Vcc, is connected to both the voltage drop detection integrated circuit 10 and the power-on/reset signal generation circuit 20. If the signal Vo is at a L level, the reset signal Vrs and ON signal Von remain effective as long as the signal Vdc is at a H level, so that the signals Vrs and Von are outputted as the signals Vrsa and Vona to the CPU 2.

As described in detail above, according to the present invention, when the supply voltage drops lower than a specified threshold value, every input is shut off from means for controlling the system executing a particular operation so that the supply voltage is prevented from being applied to the control means. Accordingly, instructions, such as reset instruction and operation start instruction, will not be inputted to the control means. As a result, the control means stops operating and is prevented from erroneous operation.

In addition, according to the present invention, it is possible to protect against destruction the programs and data stored in the memories connected to the control means.

While only certain embodiments of the present invention have been described, it will be apparent to those skilled in the art that various changes and modifications may be made therein without departing from the spirit and scope of the present invention as claimed.

What is claimed is:

1. A device for protecting a control unit in a microprocessing device that is being supplied with a voltage of a predetermined level from an external power source comprising:

detecting means, operatively connected to the external power source, for detecting the voltage level from the external power source, said detecting means producing a low voltage signal when the detected voltage level is lower than a predetermined threshold value and a normal voltage signal when the detected voltage level is equal to or above said predetermined threshold value; and prevention means, responsive to said low and normal voltage signals, for preventing the supply of the voltage to the control unit when said low voltage signal is received and for allowing the supplying of the voltage to the control unit when said normal voltage signal is received, said prevention means inhibiting control signals from being received by the control unit when said low voltage signal is received, said control signals being either a reset signal or an operation start signal, thereby preventing the control unit from operating.

2. The device as claimed in claim 1, wherein said prevention means includes, latching means for storing a signal indicating whether said low voltage or normal voltage signal was received, and switching means operatively connected to said latching means, for preventing the voltage from being supplied to the control unit when the stored signal of said latching means indicates that said low voltage signal was received.

3. A system for protecting data stored and being processed in a processing device from being destroyed during a low voltage fault, comprising:

control means for controlling operations of the processing device;

voltage supply means, operatively connected to said control means, for supplying voltage to said control means;

temporary storage means, for temporarily storing the data;

permanent storage means, for permanently storing certain of the data to be used by said control means;

detecting means operatively connected to said voltage supply means, for detecting a low voltage fault;

signal generating means, operatively connected to said detecting means, for producing a fault signal indicating that said low voltage fault has been detected;

power prevention means, operatively connected to said signal generating means, for preventing said voltage supply means from supplying voltage to said control means when said fault signal is present;

control signal inhibiting means, operatively connected to said signal generating means, for inhibiting said control unit from receiving control signals, said control signals being either a reset signal, an operational start signal, or a key-ON signal;

back-up voltage supply means, operatively connected to said temporary storage means, for providing a back-up voltage to said temporary storage means;

said control means, in response to said fault signal, causing the data being processed in the processing device to be stored in said temporary storage means when said fault signal is present; and indicating means, operatively connected to said control means, for indicating to an operator that said low voltage fault has been detected.

4. The system as claimed in claim 3, wherein said power prevention means includes, latching means, for storing said fault signal, and switching means, operatively connected to said latching means, for preventing said voltage supply means from supplying voltage to said control mans when said latching means has stored said fault signal.

5. A method for protecting data stored and being processed in a processing device having a control unit from being destroyed during a low voltage fault, comprising the steps of:

(a) supplying the control unit with a voltage;

(b) detecting a low voltage fault in the supply voltage of step (a);

(c) generating a fault signal when the low voltage fault has been detected in step (b);

(d) temporarily storing the data being processed in a random access memory device when the fault signal of step (c) is generated;

(e) preventing the voltage supply of step (a) from being supplied to the control unit when the fault signal of step (c) is generated;

(f) inhibiting control signals from being received by the control unit when the fault signal of step (c) is generated; and (g) temporarily storing operational commands in the random access memory device when the fault signal of step (c) is generated.

6. The method as claimed in claim 5, wherein the method further comprises the step of:

(h) supplying the random access memory with a back-up voltage from a back-up voltage supply.

* * * * *